(12) United States Patent
Blanding

(10) Patent No.: US 7,307,764 B2
(45) Date of Patent: Dec. 11, 2007

(54) APPARATUS AND METHOD FOR CONTROLLED MOVEMENT OF PIXEL IMAGING DEVICE

(75) Inventor: Douglass L. Blanding, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 941 days.

(21) Appl. No.: 10/620,653

(22) Filed: Jul. 16, 2003

(65) Prior Publication Data

US 2005/0013646 A1    Jan. 20, 2005

(51) Int. Cl.
*H04N 1/04* (2006.01)
*H04N 1/40* (2006.01)
*H04N 5/225* (2006.01)

(52) U.S. Cl. .................. 358/474; 358/471; 358/482; 348/340

(58) Field of Classification Search ............ 358/474, 358/471, 482, 412, 413, 505, 506; 348/340; 355/118, 131; 299/213, 379
See application file for complete search history.

(56) References Cited

U.S. PATENT DOCUMENTS

| | | | |
|---|---|---|---|
| 4,449,213 A | 5/1984 | Noborimoto et al. | |
| 4,581,649 A | 4/1986 | Morokawa | |
| 4,607,287 A | 8/1986 | Endo et al. | |
| 4,633,317 A | 12/1986 | Uwira et al. | |
| 5,063,450 A | 11/1991 | Pritchard | |
| 5,315,411 A | 5/1994 | Blanding | |
| 5,325,137 A | 6/1994 | Konno et al. | |
| 5,363,136 A | 11/1994 | Sztanko et al. | |
| 5,400,070 A | 3/1995 | Johnson et al. | |
| 5,461,411 A | 10/1995 | Florence et al. | |
| 5,521,748 A | 5/1996 | Sarraf | |
| 5,557,327 A * | 9/1996 | Hasegawa et al. | 348/340 |
| 5,652,661 A | 7/1997 | Gallipeau et al. | |
| 5,701,185 A | 12/1997 | Reiss et al. | |
| 5,743,610 A | 4/1998 | Yajima et al. | |
| 5,745,156 A | 4/1998 | Federico et al. | |
| 5,786,901 A * | 7/1998 | Okada et al. | 358/474 |
| 5,808,800 A | 9/1998 | Handschy et al. | |
| 6,552,740 B1 | 4/2003 | Wong et al. | |
| 6,574,032 B1 | 6/2003 | Roddy et al. | |
| 2003/0063838 A1 | 4/2003 | Hagood et al. | |

FOREIGN PATENT DOCUMENTS

DE    91 09 236.1    9/1991
EP    550 353 A1    12/1992

\* cited by examiner

*Primary Examiner*—Houshang Safaipour
(74) *Attorney, Agent, or Firm*—Nelson Adrian Blish

(57) ABSTRACT

An apparatus for displacing a movable platen (50) in orthogonal first and second directions within a fixed plane of a surface (62). The movable platen is suspended from a stationary housing (80). A first actuator (40) provides a first linear displacement along the first direction and a second actuator (40) provides a second linear displacement along the second direction. A lever member (70) is pivoted at a flexure element (62) and is coupled to the stationary housing (80). The position of the flexure element along the lever member defines a working arm (58) of the lever member between the flexure element and the movable platen and an effort arm (76) of the lever member between the flexure element and point of contact of the actuator. The travel distance of the movable platen relative to the first linear displacement of the first actuator is proportional to the ratio of the length of the working arm to the length of the effort arm.

47 Claims, 10 Drawing Sheets

PRIOR ART

APPARATUS AND METHOD FOR CONTROLLED MOVEMENT OF PIXEL IMAGING DEVICE

FIELD OF THE INVENTION

This invention generally relates to digital electronic imaging apparatus and more particularly relates to an apparatus and method for providing precise movement of an imaging component in orthogonal directions within a fixed plane.

BACKGROUND OF THE INVENTION

The resolution of a two-dimensional digital imaging device is constrained to a given pixel size. In a sensing device, such as a CCD sensor, pixels within the pixel matrix have a fixed size and spacing for detection of an image at a given resolution. Similarly, in a light modulation device, such as a reflective LCD spatial light modulator, pixel size and the spacing of pixels within a two-dimensional array is fixed, constraining the available resolution for forming an image.

Originally developed for forming images in display devices, spatial light modulators are increasingly being used in digital printing applications as well. In printing apparatus, spatial light modulators provide significant advantages in cost and performance over earlier digital imaging technologies, both for line printing systems such as the printer depicted in U.S. Pat. No. 5,521,748, and for area printing systems such as the system described in U.S. Pat. No. 5,652,661.

Two-dimensional area spatial light modulators, such as those using a digital micromirror device (DMD) from Texas Instruments, Dallas, Tex., or using a liquid crystal device (LCD) can be used to modulate an incoming optical beam for imaging at a given resolution. An area spatial light modulator can be considered essentially as a two-dimensional array of light-valve elements, each element corresponding to an image pixel. Each array element is separately addressable and digitally controlled to modulate light by transmitting (or by blocking transmission of) incident light from a light source, typically by affecting the polarization state of the light.

There are two basic types of area spatial light modulators in current use. The first type developed was the transmissive spatial light modulator, which, as its name implies, operates by selective transmission of an optical beam through individual array elements. The second type, a later development, is a reflective spatial light modulator. As its name implies, the reflective spatial light modulator, operates by selective reflection of an optical beam through individual array elements. A suitable example of an LCD reflective area spatial light modulator relevant to this application utilizes an integrated CMOS backplane, allowing a small footprint and improved uniformity characteristics.

Conventionally, LCD area spatial light modulators have been developed and employed for digital projection systems for image display, such as is disclosed in U.S. Pat. No. 5,325,137 and in miniaturized image display apparatus suitable for mounting within a helmet or supported by eyeglasses, as is disclosed in U.S. Pat. No. 5,808,800. LCD projector and display designs in use typically employ one or more area spatial light modulators, such as using one for each of the primary colors, as is disclosed in U.S. Pat. No. 5,743,610.

Spatial light modulators have also been employed in printing apparatus for photosensitive media. Examples of printing apparatus using digital micromirror devices (DMDs), include that disclosed in U.S. Pat. No. 5,461,411. Photographic printers using the more readily available LCD technology are described in U.S. Pat. Nos. 5,652,661; 5,701, 185; and 5,745,156, for example.

It is instructive to note that imaging requirements for projector and display use (as is typified in U.S. Pat. Nos. 5,325,137; 5,808,800; and 5,743,610) differ significantly from imaging requirements for printing by photoprocessing apparatus. Projectors are optimized to provide maximum luminous flux to a screen, with secondary emphasis placed on characteristics important in printing, such as contrast and resolution. Optical systems for projector and display applications are designed for the response of the human eye, which, when viewing a display, is relatively insensitive to image artifacts and aberrations and to image non-uniformity, since the displayed image is continually refreshed and is viewed from a distance. However, when viewing printed output from a high-resolution printing system, the human eye is not nearly as "forgiving" to artifacts and aberrations and to non-uniformity, since irregularities in optical response are more readily visible and objectionable on printed output. For this reason, there can be considerable complexity in optical systems for providing a uniform exposure energy for printing. Even more significant are differences in resolution requirements. Adapted for the human eye, projection and display systems are optimized for viewing at relatively low resolutions such as 72 dpi or less, for example. Photographic printing apparatus, on the other hand, must achieve much higher resolution, particularly with apparatus designed for micrographics applications, which can be expected to provide 8,000 dpi for some systems.

Referring to FIG. 1a, there is shown, in simplified form, the basic arrangement of an exemplary prior art imaging apparatus 10 configured as a color printer with separate red, green, and blue (RGB) color channels. There are similar components for modulating each color, represented in FIG. 1a with appended color designators when necessary: r for red, g for green, and b for blue color. A photosensitive medium 32, fed from a reel 34 onto the image plane shown as a surface 36 has characteristic cyan, magenta, and yellow response corresponding to the modulated R, G, B colored light. For the red color light modulation path, a light source 20r provides red light. Uniformizing optics 22r perform basic functions that collect light and provide uniform light for modulation. A polarization beamsplitter 24r directs unmodulated light of a given polarity to a spatial light modulator 30r. The uniformized light from light source 20r is modulated by spatial light modulator 30r, is transmitted through polarization beamsplitter 24r, and is combined at a color combiner, dichroic x-cube 26, with modulated light from corresponding components in the green light path (20g, 22g, 24g, 30g) and blue light path (20b, 22b, 24b, 30b). The modulated color image is then directed by a lens 38 for printing at surface 36. As indicated for the green color channel, the image-forming surface of each spatial light modulator 30 is positionally located at a fixed imaging plane P with respect to the imaging optics.

It must be observed that the arrangement of FIG. 1a represents a limited number of the possible embodiments for imaging apparatus 10 using area spatial light modulators 30. For example, simpler systems can be built using a single spatial light modulator 30 that is shared or multiplexed between two or three light paths, such as that shown in FIG. 1b. In this configuration, a light source 20 provides an illumination beam of red, green, and blue light in a sequence, by means of a filter wheel 28 driven by a motor 18, as is well known in the imaging art. Other methods for directing, as an illumination beam, one color at a time include using separate LEDs having the appropriate color, for example. Uniformizing optics 22 homogenize the illumination beam and provide a uniform field to a polarizing device, such as a polarization beamsplitter 24. Light of suitable polarity for modulation is then directed to a spatial light modulator 30, which modulates the illumination beam with image data that corresponds to the color of the illumination beam provided. For this method, the sequencing of image data corresponds to the sequencing of color in the illumination beam. The modulated color image is then directed by lens 38 for printing at surface 36. Again, the image-forming surface of spatial light modulator 30 is positionally located at an imaging plane P with respect to lens 38 and other imaging optics.

A number of modifications is possible for the configurations of FIGS. 1a and 1b, using techniques well known in the imaging arts. For example, one or more transmissive LCDs could be used instead of the reflective LCDs shown as spatial light modulators 30, 30r, 30g, and 30b, with a suitable rearrangement of support components in each color path.

Referring to FIG. 2, there is shown the arrangement of an ideal imaged pixel array 130 that would be provided by spatial light modulator 30. Pixel array 130 comprises individual pixels 72 arranged in a two-dimensional matrix having evenly spaced rows and columns as shown. A pixel-to-pixel distance D is a factor of the inherent spatial light modulator resolution, and is measured from the center of one pixel 72 to the center of an adjacent pixel 72. As a coarse approximation of the range of displacement distances, a pixel-to-pixel distance D for a typical LCD area spatial light modulator is typically from 10 to 12 microns.

Dithering is one method used for improving the imaging characteristics of pixel array 130. Referring to FIG. 3, there is shown a conventional dithering pattern that has been proposed for compensating for low fill factor of pixels 72 or for increasing pixel resolution. Dither movement of spatial light modulator 30 (FIGS. 1a and 1b) or of some other component in the optics path for modulated light effectively shifts pixels 72 from an original imaging position 78a to a second imaging position 78b, then to a third imaging position 78c, and then to a fourth imaging position 78d. This repeated pattern minimizes the space between pixels to improve pixel fill factor, reducing "pixelization" effects, and increases apparent resolution, as is shown in the dithered pixel array 130 representation of FIG. 4. The image data provided to the spatial light modulator is preferably changed with each shift operation, to effectively provide increased resolution. Conventionally, displacement needed for dithering is a fraction of a pixel; however, multiple-pixel dithering is also possible. Commonly-assigned U.S. Pat. Nos. 6,552,740 and 6,547,032 disclose various dithering approaches for imaging apparatus employing area spatial light modulators.

The same type of technique, using controlled incremental motion as shown in FIG. 3, can be used for increasing the effective resolution of an image sensor, such as a CCD array, for example. In the imaging arts, the term "dithering" has been used primarily in a printing context. However, for the purposes of this disclosure, this term is used with broader application, to describe the type of pixel displacement described with reference to FIG. 3 for both image-sensing and image-forming devices. For any of these devices, as was described with reference to FIGS. 1a and 1b, dithering provides movement that is substantially within the fixed plane P of the surface of spatial light modulator 30. As shown in the conventional coordinate axis representation of FIG. 3, dithering typically provides displacement in the directions of mutually orthogonal x and y axes, which lie within plane P in the context of FIGS. 1a and 1b. There is, however, no appreciable displacement in the direction of the z axis, that is, in the direction of incident light, chiefly in order to maintain correct focus. Moreover, any dithering mechanism must also constrain any rotational displacement about the z axis (referred to as $\theta_z$).

Various mechanisms for providing controlled dithering motion and thereby increasing effective image resolution have been proposed, with application to various fields, including the following:

Commonly-assigned U.S. Pat. No. 5,400,070 discloses an imaging sensing apparatus using a tiltable refraction plate for redirecting incoming light to a solid state image sensor, such as a charge-coupled device (CCD), where a motor-actuated cam is used to provide suitable tilting action;

U.S. Pat. No. 5,786,901 discloses an image shifting device using piezoelectric actuators to control the tilt of a refraction plate in the optical path of an image sensor;

U.S. Pat. No. 5,557,327 discloses a mechanism for pixel shifting within an image sensing apparatus using motors cooperating with spring constraints to tilt a refractive element to one or more positions;

U.S. Pat. No. 4,449,213 discloses an optical reading apparatus providing X-Y displacement using electromagnetic actuation to shift the position of an objective lens;

U.S. Pat. No. 4,581,649 discloses a system for improved image detection using dithering motion caused by solenoid actuation;

U.S. Pat. No. 4,607,287 discloses vibration of an image sensor using piezoelectric actuators to achieve higher image resolution;

Commonly-assigned U.S. Pat. No. 5,063,450 discloses a dithering motion in a camera for prevention of aliasing, wherein an image sensor is mounted onto a piezoelectric actuator;

U.S. Pat. No. 4,633,317 discloses an electro-optical detector system using a dithered image offset controlled using electromagnetic actuators driving a reflective member; and U.S. Patent Application Publication No. 2003/0063838 discloses a beam steering apparatus using piezoelectric actuators for cross-connect switching of optical signals.

As the above listing shows, mechanisms employed for providing the displacement needed for dithering have included electromagnetic and piezoelectric actuators. These devices can achieve precision movement over various ranges, depending on the device type. However, while each of the above-mentioned approaches has merit for a particular application, given a specific displacement distance, prior art approaches have not provided a low-cost, precision dithering mechanism that can, at the same time, be adapted for a range of different displacement distances and meets rigid criteria for compactness, robustness, and adjustability. Moreover, there are advantages to solutions that do not interpose added optical components, such as glass plates, which can be sensitive to dirt and dust and may introduce unwanted optical effects.

Thus, it can be seen that there is a need for an apparatus and method for achieving controlled dither motion of an imaging device in orthogonal directions, within a fixed plane.

SUMMARY OF THE INVENTION

It is an object of the present invention to provide a dither mechanism for precision pixel displacement within an imaging apparatus. With this object in mind, the present invention provides an apparatus for shifting a movable platen between a resting position and an actuated position, the apparatus comprising:

(a) means for suspending the movable platen from a stationary housing to allow movement of the movable platen between the resting and actuated positions;

(b) a lever member pivoted at a flexure element, the flexure element being coupled to the stationary housing, the position of the flexure element along the lever member defining:

(i) a working arm of the lever member between the flexure element and the movable platen;

(ii) an effort arm of the lever member between the flexure element and the point of contact of an actuator; and the effort arm driven by the actuator to shift the movable platen from the resting position to the actuated position, such that the travel distance of the movable platen between the resting position and the actuated position is proportional to the ratio of the length of the working arm to the length of the effort arm.

From another aspect, the present invention provides an apparatus for displacing a movable platen in first and second directions, substantially within the fixed plane of the surface of the platen, the apparatus comprising:

(a) means for suspending the movable platen from a stationary housing to allow movement within the fixed plane;

(b) a first actuator for providing a first displacement along the first direction and a second actuator for providing a second displacement along the second direction;

(c) a lever member pivoted at a flexure element, the flexure element being coupled to the stationary housing, the position of the flexure element along the lever member defining:

(i) a working arm of the lever member between the flexure element and the movable platen;

(ii) an effort arm of the lever member between the flexure element and the point of contact of the first actuator; and the effort arm driven by the first actuator and by the second actuator, such that the travel distance of the movable platen relative to the first displacement of the first actuator is proportional to the ratio of the length of the working arm to the length of the effort arm.

It is a feature of the present invention that it employs levered motion for multiplying the displacement provided by an actuator by a predetermined ratio.

It is an advantage of the present invention that it provides a low-cost apparatus for achieving precision dithering displacement. The apparatus of the present invention provides this controlled movement within the fixed plane of the surface of an image-forming or image-sensing device, so that dithering can be achieved without a refocus requirement. At the same time, the apparatus and method of the present invention prevent undesirable rotation of the image-forming or image-sensing surface.

It is a further advantage of the present invention that it does not introduce additional components into the optical path for the purpose of providing dither displacement.

It is yet a further advantage of the present invention that it enables compact packaging of components for achieving precision dither displacement.

It is yet a further advantage of the present invention that it provides a low-cost mechanism for dithering that is robust and can be used for both image-forming and image-sensing devices.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 5:
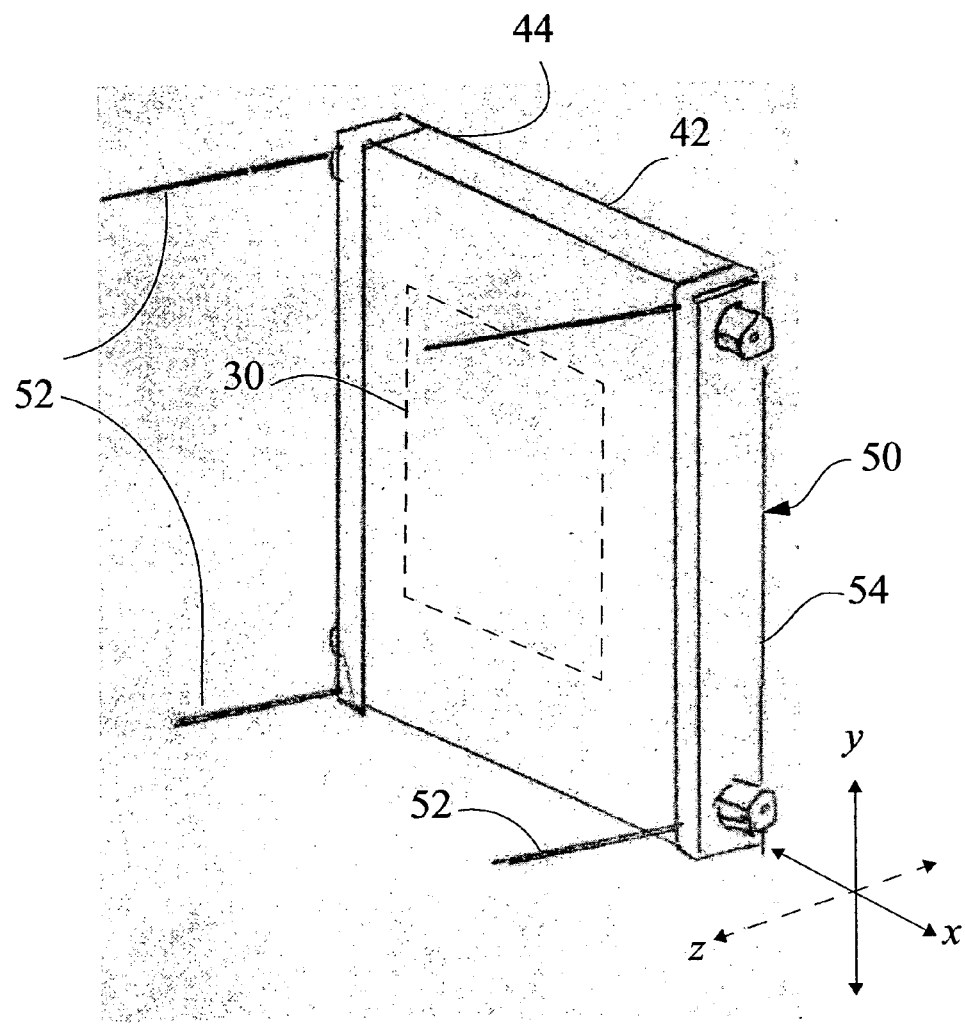
FIG. 5 is a perspective view showing suspension of a holder for an imaging device.
Figure 6:
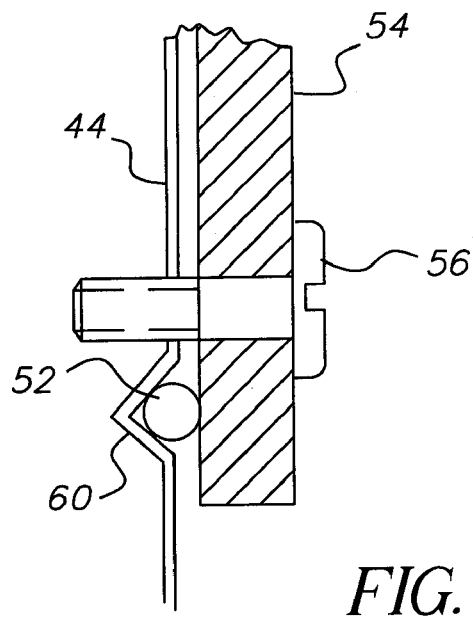
FIG. 6 is an enlarged, cutaway side view showing connection of a wire flexure for suspension of the holder in FIG. 5.
Figure 7:
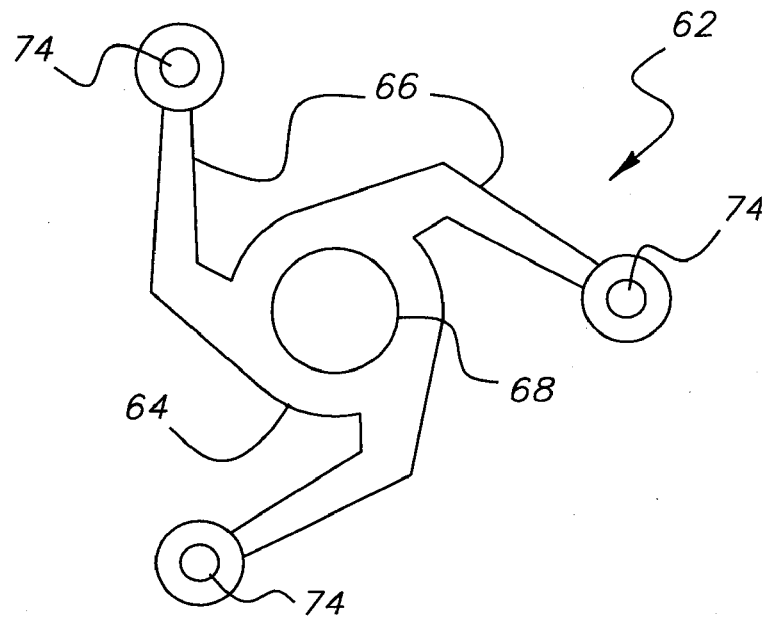
FIG. 7 is a plane view showing a torsion-constraining sheet flexure used for controlling movement in the apparatus of the present invention.

FIGS. 5, 6, and 7 show various components and techniques used for key mechanical elements of a preferred embodiment device. Referring to FIG. 5, there is shown a perspective rear view of a platen 50 for allowing movement between a resting position and an actuated position, in a single direction or in orthogonal directions x and y within the same fixed plane. Platen 50 is suspended from a mounting element, described subsequently, using clamped wire flexures 52. Wire flexures 52 allow only the slight displacement of platen 50 needed for dithering, with only minimal movement along the z direction, so that the movement of platen 50 can be considered to be substantially within a fixed plane. The dither apparatus of the present invention mounts, to the front side of a mounting surface 42 of platen 50 (not visible in the view of FIG. 5), spatial light modulator 30 (shown in dotted outline). In one embodiment, wire flexures 52 are 0.010 stainless steel, having sufficient strength for maintaining platen 50 in either resting or actuated positions. FIG. 6 shows, for one embodiment, how wire flexure 52 is attached orthogonally to platen 50, using a V-feature 60 for seating wire flexure 52, with a clamp 54 fastened using screw 56 to a support member 44. Clamp 54 is thereby held tightly against wire flexure 52.

Referring to FIG. 7, there is shown a sheet flexure 62 used to provide mechanical coupling with torsional constraint in an apparatus of the present invention. Sheet flexure 62 comprises an annular portion 64 around an opening 68 and an arrangement of tangentially extended arms 66. Each extended arm 66 can be mechanically mounted using holes 74. With this arrangement, sheet flexure 62 allows a slight degree of bending for movement of an element that is seated within opening 68, without allowing rotation relative within the plane of extended arms 66.

Figure 8:
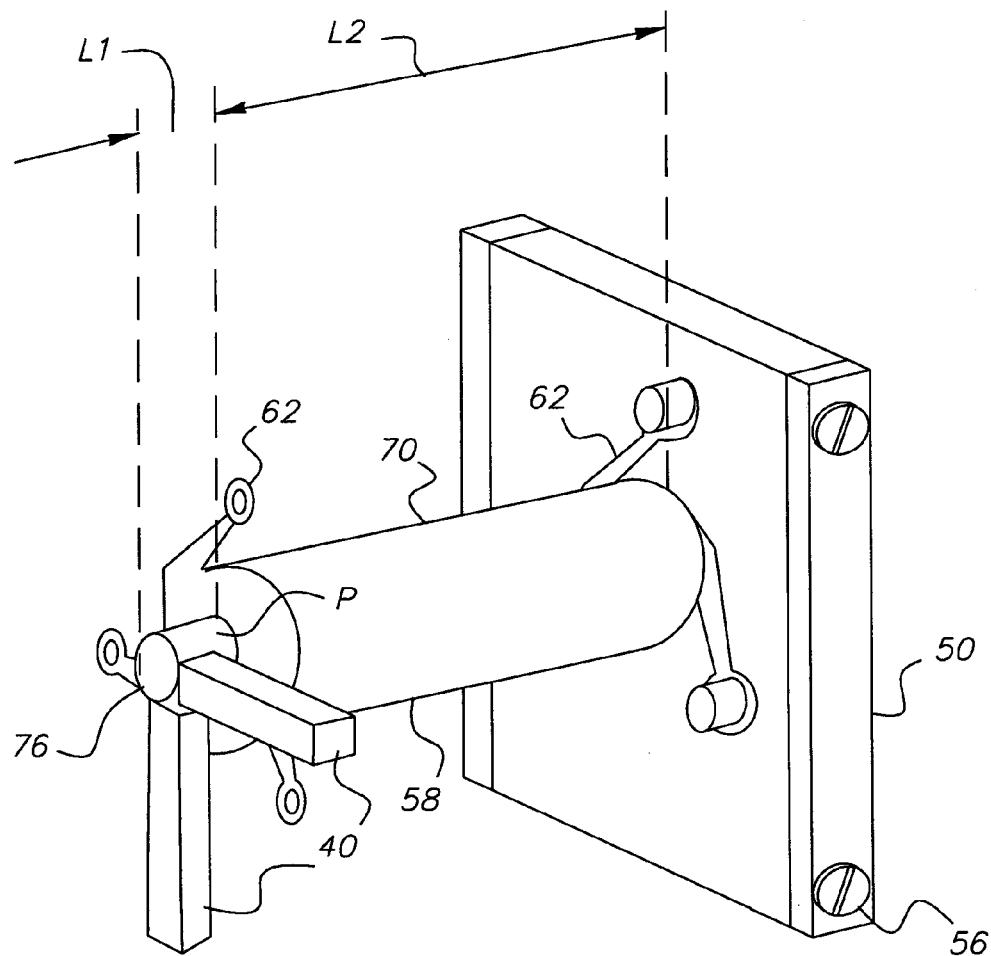
FIG. 8 is a perspective view showing a portion of the components used for controlling movement in the apparatus of the present invention.

Referring to FIG. 8, there is shown a partial assembly of the overall mechanism that provides controlled displacement to platen 50 in orthogonal directions. Actuators 40 provide linear force against an effort arm 76 of a lever member 70 in the x or y direction, as shown. Lever member 70 is fitted within sheet flexure 62, thereby establishing a pivot point P that, in turn, defines length L1 of effort arm 76 and length L2 of a resistance arm or working arm 58. Applying standard lever principles, it can be seen that lever action multiplies the incremental movement of actuator 40 by the ratio of lengths L2:L1. This multiplier causes a displacement of platen 50 according to actuator 40 direction. Lever member 70 is mounted to platen 50 using another sheet flexure 62. This arrangement effectively provides a fulcrum and constrains rotational movement of platen 50 relative to lever member 70.

Figure 9:
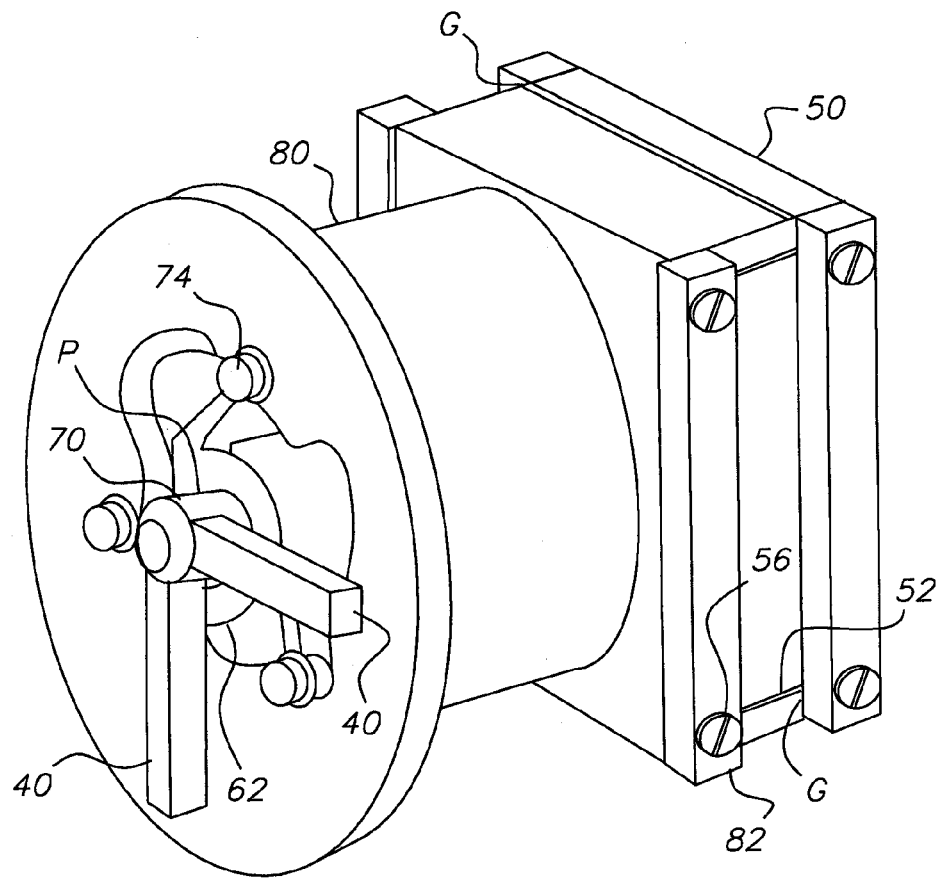
FIG. 9 is a perspective view adding a housing used for mounting components in the apparatus of the present invention.

Referring to FIG. 9, there is shown a more complete assembly that adds, to the basic arrangement shown in FIG. 8, supporting mounting components for providing controlled displacement to platen 50. A housing 80 provides support for mounting sheet flexure 62 at pivot point P. Housing 80 also provides mounting support for suspension of platen 50, using wire flexures 52 as was described with reference to FIGS. 5 and 6. A bracket portion 82 of housing 80 provides screws 56 for attachment of wire flexures 52, as was shown in FIG. 6. A small gap G is maintained between bracket portion 82 and platen 50, allowing displacement of platen 50 by the action of lever member 70. To maintain gap G to a fixed distance value, an optional spring (not shown) can be fitted into gap G. A curved metal spring positioned within gap G, for example, would maintain gap G spacing as well as providing some friction damping constraint to improve settle time of platen 50 following movement between resting and actuated positions.

Figure 10:
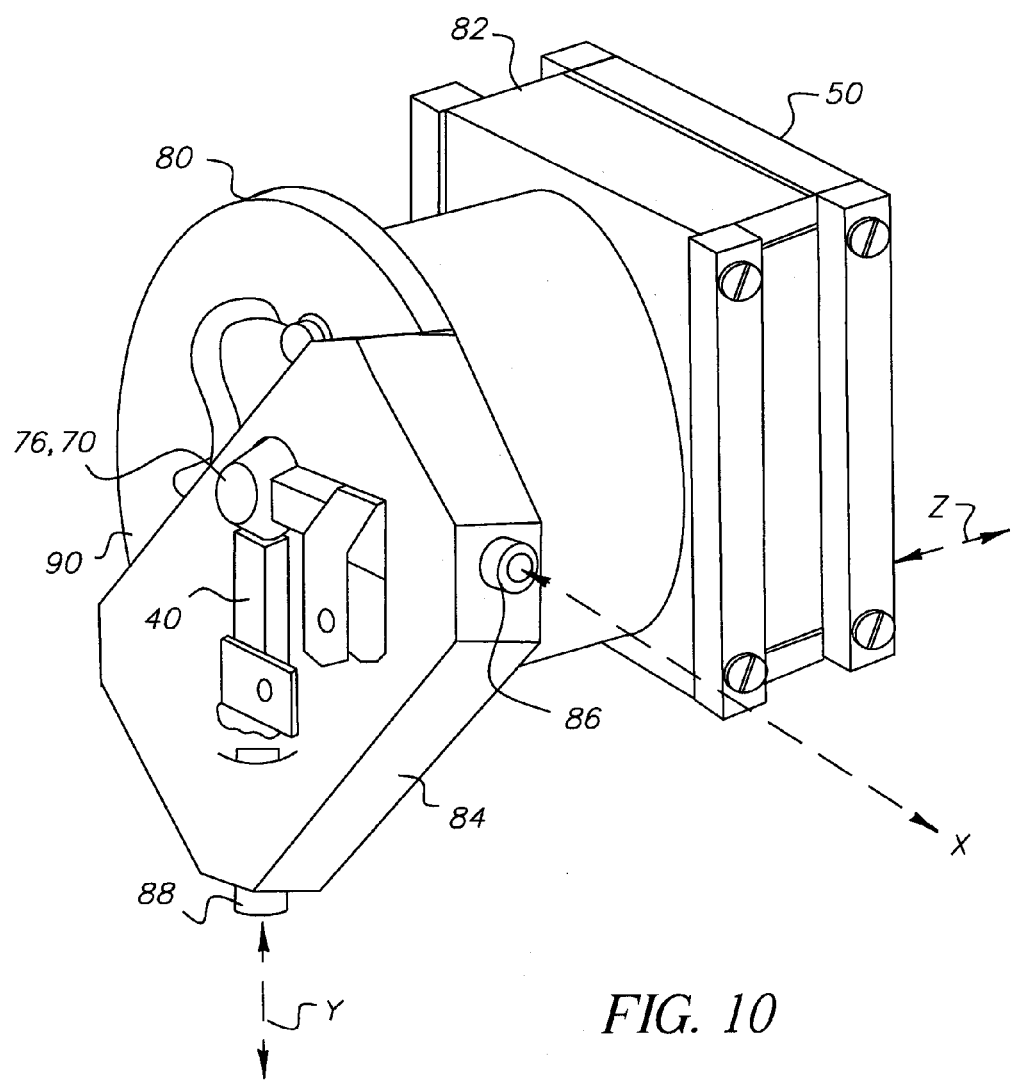
FIG. 10 is a perspective view showing an assembled apparatus for controlling movement according to the present invention.

Referring to FIG. 10, there is shown an added actuator support bracket 84 that is attached to housing 80 for mounting actuators 40. An adjustment screw 86 provides an adjustment for the position of actuator 40 in the x direction. Another adjustment screw 88 provides the corresponding function in the y direction. A flat spring 90 is fitted into actuator support bracket 84 to provide opposing force for movement of effort arm 76 of lever member 70.

Leverage Options

The apparatus of the present invention provides a robust mechanism for pixel dithering that meets demanding criteria for providing accurate movement in orthogonal x and y directions within a fixed plane. By specifying length L1 of effort arm 76 relative to length L2 of working arm 58, this apparatus provides a multiplier for the linear displacement of actuator 40, allowing movement to be accurately controlled to within tight tolerances. Where length L2>L1, the highly accurate motion of a piezoelectric actuator can be harnessed and adapted for use well outside its conventional range of applications. Where length L2<L1, scaled-down distances can be achieved more easily, thereby extending the usable range of many types of electromagnetic actuators for highly accurate positioning.

It must also be emphasized that the embodiment shown in FIGS. 8-10 employs a first class lever principle, where actuator 40 displacement of effort arm 76 in one direction causes corresponding displacement of working arm 58 and platen 50 in the opposite direction. Sheet flexure 62 defines the fulcrum position. Other types of lever arrangement are also possible for dithering motion, or other positioning motion, using the methods and apparatus of the present invention. Possible alternative arrangements include use of lever member 70 as a second class lever, with actuator 40 displacement in the same direction as platen 50 load movement. For this type of arrangement, platen 50 would be between the fulcrum position defined by sheet flexure 62 and the point of application of actuator 40 force. Lever member 70 could also be deployed as a third class lever, where effort arm 76 displacement is also in the same direction as platen 50 is moved. In a third class lever configuration, actuator 40 force would be applied between the fulcrum, defined by the position of sheet flexure 62, and platen 50.

Unlike the first class configuration in which working arm 58 and effort arm 76 are on opposite sides of the fulcrum point defined by sheet flexure 62, working arm 58 and effort arm 76 overlap in second and third class lever arrangements. In each case, however, the distance of working arm 58 (L2 for the first class lever arrangement of the embodiment in FIG. 8) is the distance between the fulcrum (sheet flexure 62) and the load (platen 50). Effort arm 76 (L1 for the first class lever arrangement of the embodiment in FIG. 8) has a distance measured between the fulcrum (sheet flexure 62) and the point of force applied by actuator 40.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. As is emphasized hereinabove, the apparatus and method of the present invention could be applied to a broad range of imaging devices, including both image-forming devices and image-sensing devices, such as those using charge-coupled devices (CCDs) as sensors. The apparatus and method described could alternately be applied to devices other than those used for imaging, such as for highly accurate positioning of components. Actuator 40, a piezoelectric device in the embodiment described, could be another type, such as an electromagnetic actuator. While actuators 40 apply force at mutually orthogonal angles in the preferred embodiment of FIGS. 8-10, other arrangements are possible, provided platen 50 is constrained from movement along or rotation about the z-axis. The function of housing 80 could be implemented in a number of alternate ways, suited to the configuration of the overall apparatus.

The apparatus of the present invention provides a limited range of motion of platen 50 in orthogonal x and y directions within a fixed plane, effectively preventing movement in the z direction as well as preventing rotation about the z axis where z is in the direction of a normal to the surface of platen 50 as shown in FIG. 8. In imaging apparatus, this requirement to constrain the position of platen 50 substantially within the same fixed plane relates to optical requirements. That is, the optical support system in an imaging apparatus typically allows only a minimal tolerance for movement in the z direction. Absolute constraint in the z direction is neither practical, nor required in most imaging apparatus that use dithering; however, any movement in the z direction must be minimized so that acceptable focus is maintained during dither movement.

Figure 1A:
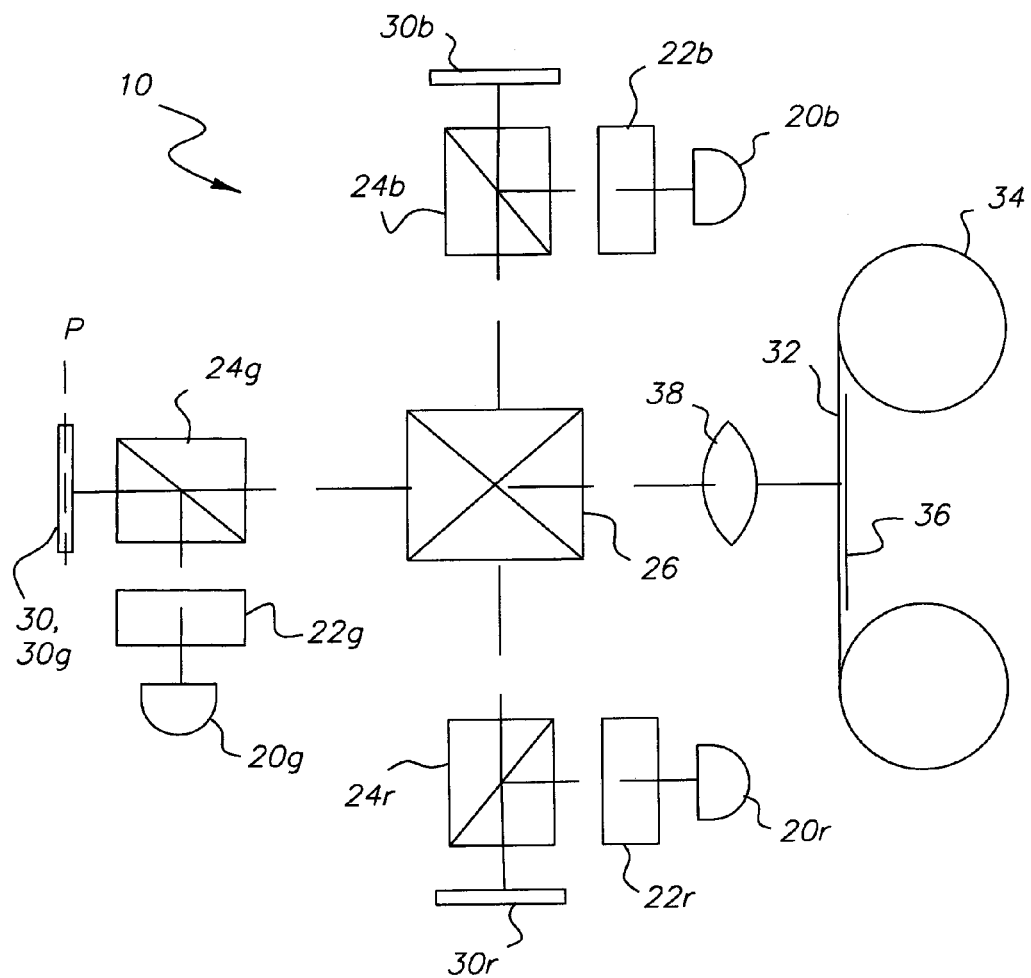
FIG. 1a is a schematic block diagram showing an image-forming apparatus using an area spatial light modulator in each of three color paths.
Figure 1B:
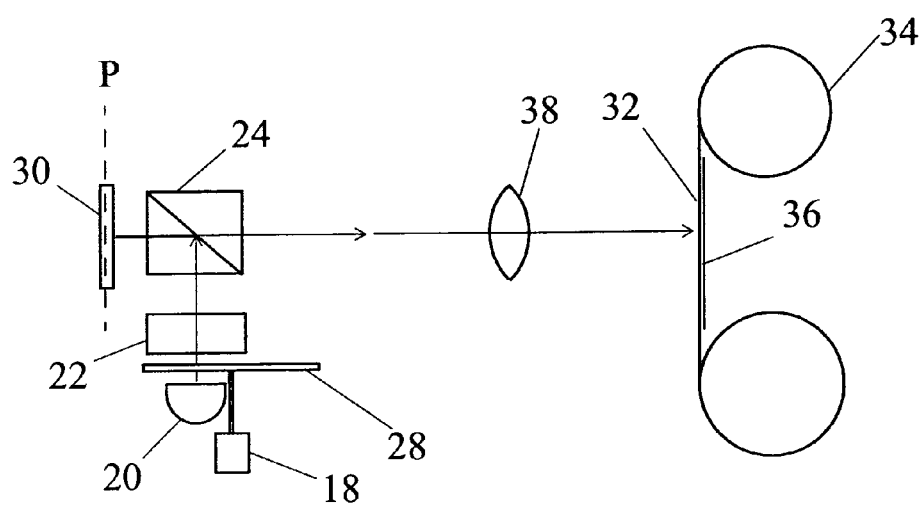
FIG. 1b is a schematic block diagram showing an image-forming apparatus using an area spatial light modulator for each color component of an image.
Figure 2:
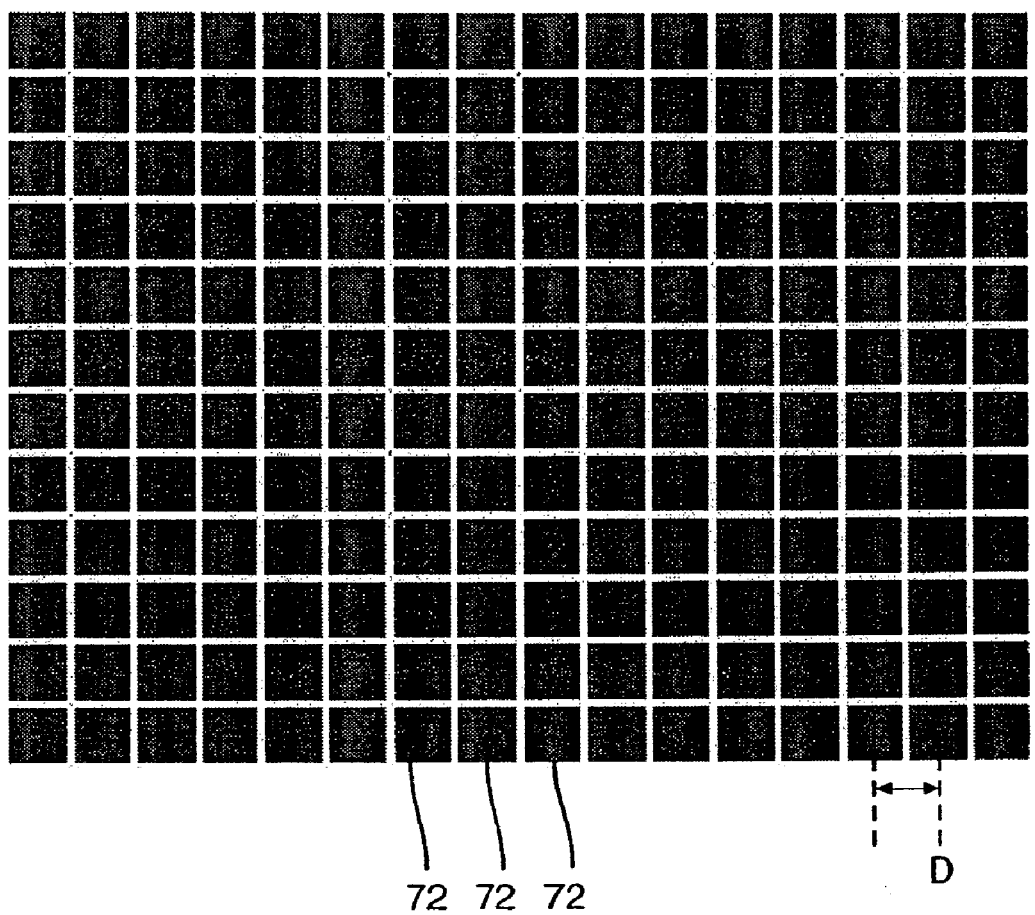
FIG. 2 is a plan view showing a basic pixel arrangement for a representative portion of an area spatial light modulator.
Figure 3:
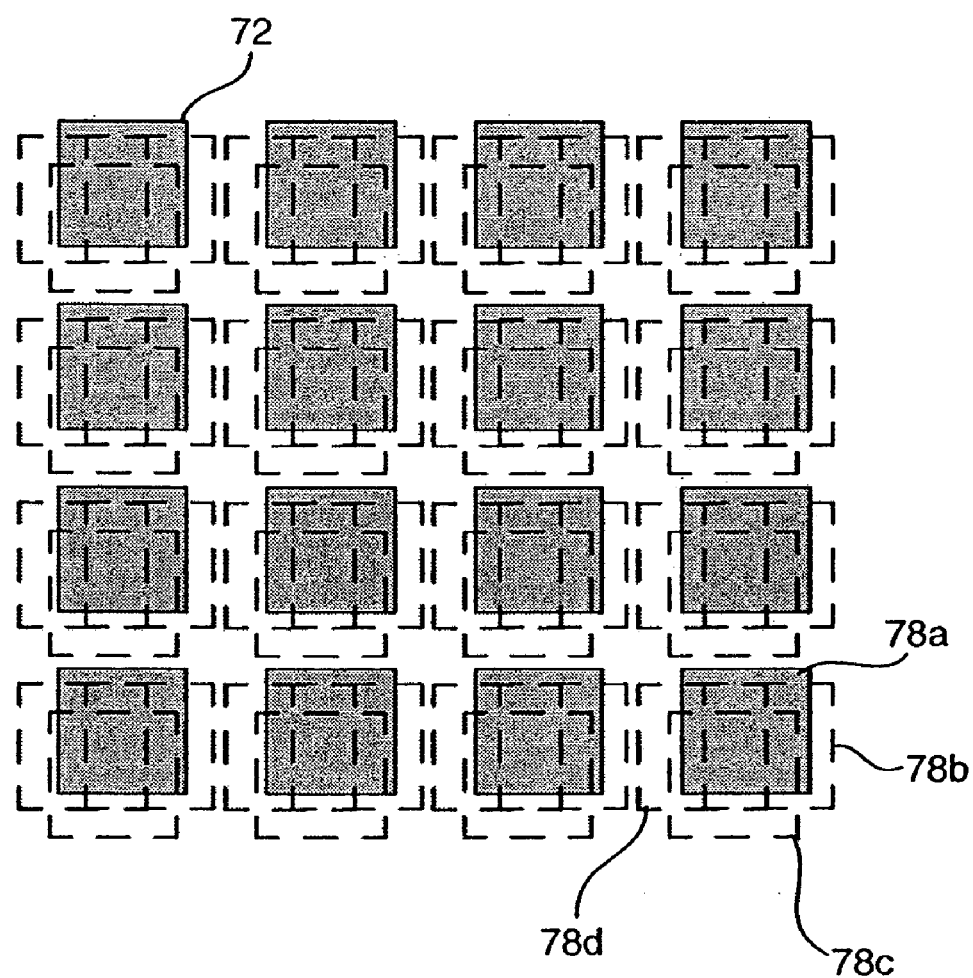
FIG. 3 shows a dithering sequence conventionally used for increasing effective resolution and for improving pixel fill factor.
Figure 4:
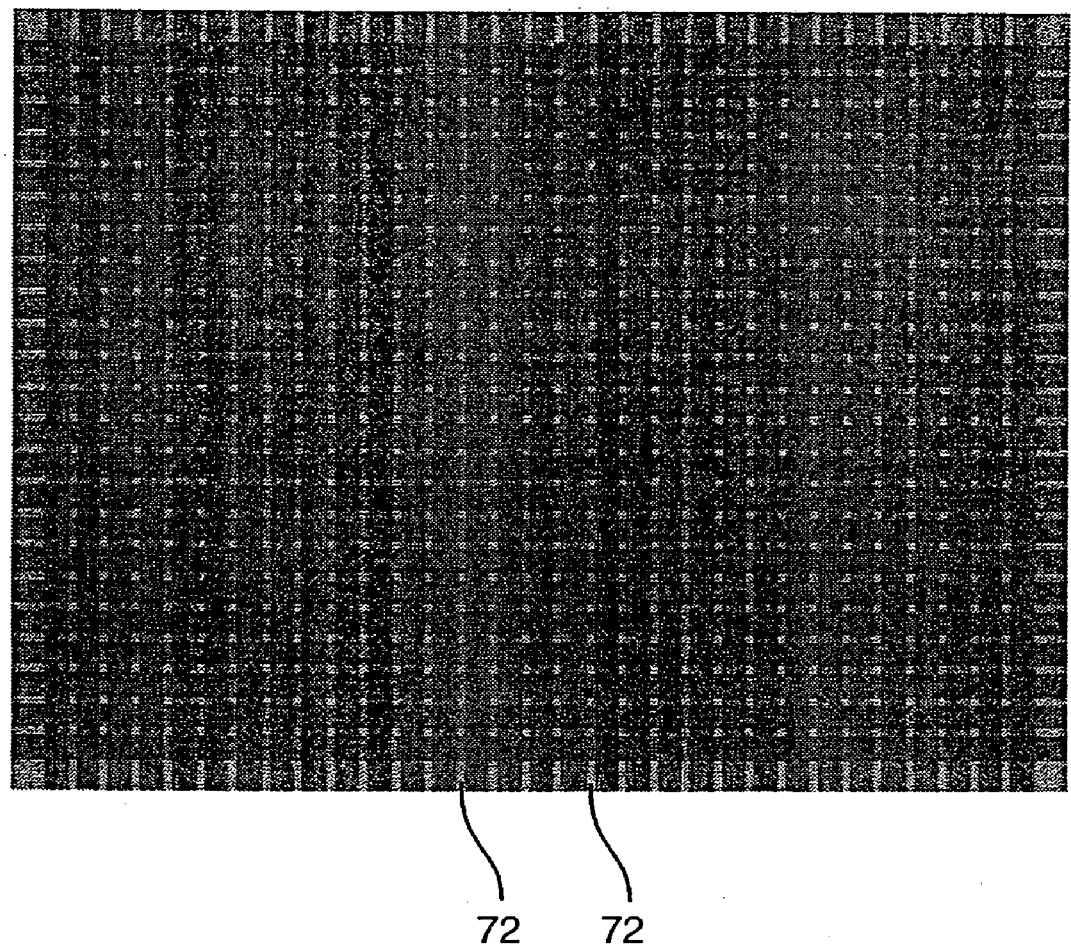
FIG. 4 shows an example image resulting from conventional dithering.

As described hereinabove, the apparatus of the present invention operates in two orthogonal directions, enabling the convention dithering pattern of FIG. 3 to be obtained. However, there may be applications for controlled precision displacement between a resting position and an actuated position in only a single direction using the apparatus and method of the present invention. For example, using a single actuator 40, movable platen 50 could be used to support a linear spatial light modulator, or to mount an area spatial light modulator 30 for dither motion in a single direction only.

Thus, what is provided is an apparatus and method for providing precision movement that is particularly well adapted to imaging applications for image-sensing or image-forming apparatus.

PARTS LIST 10 imaging apparatus
18 motor
20 light source
20r light source, red
20g light source, green
20b light source, blue
22 uniformizing optics
22r uniformizing optics, red
22g uniformizing optics, green
22b uniformizing optics, blue
24 polarization beamsplitter
24r polarization beamsplitter, red
24g polarization beamsplitter, green
24b polarization beamsplitter, blue
26 x-cube
28 filter wheel
30 spatial light modulator
30r spatial light modulator, red
30g spatial light modulator, green
30b spatial light modulator, blue
32 photosensitive medium
34 reel
36 surface
38 lens
40 actuator
42 mounting surface
44 support member
50 platen
52 wire flexures
54 clamp
56 screw
58 working arm
60 V-feature
62 sheet flexure
64 annular portion
66 extended arm
68 opening
70 lever member
72 pixel
74 holes
76 effort arm
78a original imaging position
78b second imaging position
78c third imaging position
78d fourth imaging position
80 housing
82 bracket portion
84 actuator support bracket
86 adjustment screw
88 adjustment screw
90 spring
130 pixel array

What is claimed is:

1. An apparatus for shifting a movable platen between a resting position and an actuated position, the apparatus comprising:
   (a) means for suspending said movable platen from a stationary housing to allow movement of said movable platen between said resting and said actuated positions;
   (b) a lever member pivoted at a flexure element, said flexure element being coupled to said stationary housing, the position of said flexure element along said lever member defining:
      (i) a working arm of said lever member between said flexure element and the movable platen; and
      (ii) an effort arm of said lever member between said flexure element and the point of contact of an actuator; and
   said effort arm driven by said actuator to shift said movable platen from said resting position to said actuated position, such that the travel distance of said movable platen between said resting position and said actuated position is proportional to the ratio of the length of said working arm to the length of said effort arm.

2. An apparatus for shifting a movable platen according to claim 1 further comprising a return spring in contact with said effort arm.

3. An apparatus for shifting a movable platen according to claim 1 wherein said actuator is a piezoelectric actuator.

4. An apparatus for shifting a movable platen according to claim 1 wherein said actuator is an electromagnetic actuator.

5. An apparatus for shifting a movable platen according to claim 1 further comprising adjustment means for said actuator.

6. An apparatus for shifting a movable platen according to claim 1 wherein said flexure element comprises a torsional flexure.

7. An apparatus for shifting a movable platen according to claim 1 further comprising a spring disposed for applying a damping force between said stationary housing and the movable platen.

8. An apparatus for shifting a movable platen according to claim 1 further comprising a spatial light modulator attached to said platen.

9. An apparatus for shifting a movable platen according to claim 1 further comprising a charge-coupled device attached to said platen.

10. An apparatus for shifting a movable platen according to claim 1 wherein the surface of the platen is substantially within the same plane at both said resting position and said actuated position.

11. An apparatus for shifting a movable platen according to claim 1 wherein said working arm and said effort arm are non-overlapping, the position of said flexure element along said lever member defining a first class lever thereby.

12. An apparatus for displacing a movable platen in first and second directions, substantially within the fixed plane of the surface of the platen, the apparatus comprising:
   (a) means for suspending the movable platen from a stationary housing to allow movement within the fixed plane;
   (b) a first actuator for providing a first displacement along the first direction and a second actuator for providing a second displacement along the second direction;
   (c) a lever member pivoted at a flexure element, said flexure element being coupled to said stationary housing, the position of said flexure element along said lever member defining:
      (i) a working arm of said lever member between said flexure element and the movable platen;
      (ii) an effort arm of said lever member between said flexure element and the point of contact of said first actuator; and
   said effort arm driven by said first actuator and by said second actuator, such that the travel distance of said movable platen relative to said first displacement of said first actuator is proportional to the ratio of the length of said working arm to the length of said effort arm.

13. An apparatus for displacing a movable platen according to claim 12 wherein said first and second directions are, respectively, orthogonal within the fixed plane.

14. An apparatus for displacing a movable platen according to claim 12 wherein said first displacement is linear.

15. An apparatus for displacing a movable platen according to claim 12 further comprising a return spring in contact with said effort arm.

16. An apparatus for displacing a movable platen according to claim 12 wherein said first actuator is a piezoelectric actuator.

17. An apparatus for displacing a movable platen according to claim 12 wherein said first actuator is an electromagnetic actuator.

18. An apparatus for displacing a movable platen according to claim 12 further comprising adjustment means for said first actuator.

19. An apparatus for displacing a movable platen according to claim 12 wherein said flexure element comprises a torsional flexure.

20. An apparatus for displacing a movable platen according to claim 12 further comprising a spring disposed for applying a damping force between said stationary housing and the movable platen.

21. An apparatus for displacing a movable platen according to claim 12 further comprising a spatial light modulator attached to said platen.

22. An apparatus for displacing a movable platen according to claim 12 further comprising a charge-coupled device attached to said platen.

23. An apparatus for displacing a movable platen according to claim 12 wherein said working arm and said effort arm are non-overlapping, the position of said flexure element along said lever member defining a first class lever thereby.

24. An apparatus for providing a linear displacement to a movable platen in a first direction comprising:
   (a) means for suspending said movable platen from a stationary housing to allow movement between a resting position and an actuated position in the first direction;
   (b) an actuator for providing an initial linear displacement along said first direction;
   (c) a lever member pivoted at a flexure element, said flexure element comprising an annular structure within which said lever member is seated to define a pivot point,
   said pivot point defining:
      (i) a working arm of said lever member between said flexure element and the movable platen;
      (ii) an effort arm of said lever member between said flexure element and the point of contact of said actuator; and
   said effort arm driven by said actuator, such that the travel distance of said movable platen relative to said initial linear displacement is proportional to the ratio of the length of said working arm to the length of said effort arm.

25. An apparatus for providing a linear displacement according to claim 24 wherein said flexure element comprises a plurality of spaced apart, tangentially extended mounting arms for constraining torque about the central axis of said lever member.

26. An apparatus for providing a linear displacement according to claim 24 further comprising a return spring in contact with said effort arm.

27. An apparatus for providing a linear displacement according to claim 24 wherein said actuator is a piezoelectric actuator.

28. An apparatus for providing a linear displacement according to claim 24 wherein said actuator is an electromagnetic actuator.

29. An apparatus for providing a linear displacement according to claim 24 further comprising adjustment means for said actuator.

30. An apparatus for providing a linear displacement according to claim 24 wherein said flexure element comprises a torsional flexure.

31. An apparatus for providing a linear displacement according to claim 24 further comprising a spring disposed for applying a damping force between said stationary housing and the movable platen.

32. An apparatus for providing a linear displacement according to claim 24 further comprising a spatial light modulator attached to said movable platen.

33. An apparatus for providing a linear displacement according to claim 24 further comprising a charge-coupled device attached to said movable platen.

34. A method for displacing a movable platen substantially within a fixed plane between a resting position and an actuated position comprising:
   (a) suspending the movable platen from a stationary housing to allow movement within the fixed plane;
   (b) pivoting a lever member at a flexure element and coupling said flexure element to said stationary housing, the position of said flexure element along said lever member defining:
      (i) a working arm of said lever member between said flexure element and the movable platen;
      (ii) an effort arm of said lever member between said flexure element and the point of contact of said first actuator; and
   (c) urging said effort arm by an actuator, such that the travel distance of said movable platen between the resting position and the actuated position is proportional to the ratio of the length of said working arm to the length of said effort arm.

35. A method for displacing a movable platen according to claim 34 wherein the step of pivoting said lever member at said flexure element defines a first-class lever.

36. A method for displacing a movable platen according to claim 34 wherein the step of suspending comprises the step of mounting a plurality of taut wires between said stationary housing and the movable platen.

37. A method for displacing a movable platen according to claim 34 wherein the step of urging said effort arm comprises the step of actuating a piezoelectric actuator.

38. A method for displacing a movable platen according to claim 34 wherein the step of urging said effort arm comprises the step of actuating an electromagnetic actuator.

39. A method for displacing a movable platen according to claim 34 further comprising the step of attaching a spatial light modulator to said movable platen.

40. A method for displacing a movable platen according to claim 34 further comprising the step of attaching an image sensor to said movable platen.

41. A method for displacing a movable platen in first and second directions, substantially within the fixed plane of the surface of the platen, the method comprising:
  (a) suspending the movable platen from a stationary housing to allow movement within the fixed plane;
  (b) mounting a first actuator for providing a first displacement along the first direction and a second actuator for providing a second displacement along the second direction;
  (c) pivoting a lever member at a flexure element and coupling said flexure element to said stationary housing, the position of said flexure element along said lever member defining:
    (i) a working arm of said lever member between said flexure element and the movable platen;
    (ii) an effort arm of said lever member between said flexure element and the point of contact of said first actuator; and
  (d) urging said effort arm by said first actuator and by said second actuator, such that the travel distance of said movable platen relative to said first displacement of said first actuator is proportional to the ratio of the length of said working arm to the length of said effort arm.

42. A method for displacing a movable platen according to claim 41 wherein the step of suspending comprises the step of mounting a plurality of taut wires between said stationary housing and the movable platen.

43. A method for displacing a movable platen according to claim 41 wherein the step of mounting a first actuator further comprises the step of positioning a spring for applying a resistive force against said effort arm.

44. A method for displacing a movable platen according to claim 41 wherein the step of urging said effort arm comprises the step of actuating a piezoelectric actuator.

45. A method for displacing a movable platen according to claim 41 wherein the step of urging said effort arm comprises the step of actuating an electromagnetic actuator.

46. A method for displacing a movable platen according to claim 41 further comprising the step of attaching a spatial light modulator to said movable platen.

47. A method for displacing a movable platen according to claim 41 further comprising the step of attaching an image sensor to said movable platen.

* * * * *